United States Patent [19]
Zipser et al.

[11] Patent Number: 5,738,380
[45] Date of Patent: Apr. 14, 1998

[54] FUEL FILL DEVICE FOR TRACTORS

[75] Inventors: Randall E. Zipser, Lititz; Dennis L. White; Edward J. Hines, both of Lancaster, all of Pa.

[73] Assignee: New Holland North America, Inc., New Holland, Pa.

[21] Appl. No.: 302,452

[22] Filed: Sep. 9, 1994

[51] Int. Cl.⁶ .................. B60K 15/03; B60K 15/063; B65B 3/22
[52] U.S. Cl. .................. 280/834; 137/571; 220/86.2; 220/564
[58] Field of Search .................. 280/834; 137/571, 137/575, 587, 590, 592, 590.5; 220/86.2, 505, 4.14, 562, 564

[56] References Cited

U.S. PATENT DOCUMENTS

| | | | |
|---|---|---|---|
| 2,165,357 | 7/1939 | Emmert | 220/86.2 |
| 4,288,086 | 9/1981 | Oban et al. | 280/834 |
| 4,394,925 | 7/1983 | Rump et al. | 280/834 X |
| 4,651,889 | 3/1987 | Uranishi et al. | 280/834 X |
| 4,700,864 | 10/1987 | Galles et al. | 220/86.2 |
| 4,703,771 | 11/1987 | Mimura | 137/571 X |
| 4,799,565 | 1/1989 | Handa et al. | 280/834 X |
| 4,852,892 | 8/1989 | Reid | 280/834 |
| 4,881,578 | 11/1989 | Rich et al. | 220/86.2 X |
| 5,029,722 | 7/1991 | Bollinger et al. | 220/86.2 X |
| 5,183,170 | 2/1993 | Stege | 220/86.2 |
| 5,344,038 | 9/1994 | Freeman et al. | 220/562 X |
| 5,360,040 | 11/1994 | Thorn et al. | 220/86.2 X |

*Primary Examiner*—Eric D. Culbreth
*Assistant Examiner*—F. Zeender
*Attorney, Agent, or Firm*—Larry W. Miller; J. William Stader; Frank A. Seemar

[57] ABSTRACT

A fuel fill system for use on a tractor having a lower fuel tank provided with an upwardly projecting fuel fill neck and an upper tank connected to the lower tank for flow communication therewith is disclosed wherein a filler tube is sealed against the fuel fill neck to define the inlet opening for the introduction of fuel into the lower tank. The filler tube is provided with a distal elbow defining an outlet opening positioned below the upper tank to direct gaseous bubbles within the filler tube to collect in said fuel fill neck or in other remote parts of the upper and lower tanks. A vent hole is provided in the filler tube near the inlet opening to allow the fuel to rise within the fuel fill neck as the upper tank fills. An adapter is threaded onto the fuel fill neck to capture a flange formed on the filler tube at the inlet opening to seal the filler tube against the fuel fill neck. A detachable cap is threadably received on the adapter to close off the inlet opening.

26 Claims, 5 Drawing Sheets

FUEL FILL DEVICE FOR TRACTORS

BACKGROUND OF THE INVENTION

This invention relates generally to off-road motor vehicles, such as tractors, and more particularly, to a fuel tank apparatus for holding a supply of fuel for the vehicle engine.

Tractors, among other off-road vehicles, often utilize dual fuel tanks to take advantage of available space to carry a supply of fuel for the vehicle engine. In one dual tank configuration, one tank is positioned higher than the other tank so that the upper tank drains by gravity into the lower tank, with the lower tank having a fuel fill neck operably connected to it for the introduction of fuel into the system from an external source. Since the upper tank is vented to the atmosphere and the inlet opening for the fuel fill neck is higher than the top of the upper tank, the upper tank is filled from the lower tank without the need for pumps, etc. A significant advantage of such a fuel tank configuration is that the inlet opening for the fuel fill neck can be positioned at a lower, more accessible elevation for the operator.

A significant disadvantage of such a dual fuel tank configuration is the accompaniment of gaseous air bubbles, particularly with the introduction of diesel fuel, into the fuel tank system. Since the upper tank does not begin to fill until the lower tank is full of fuel, much of the gaseous air bubbles collects in the fuel fill neck in the form of a foam which rises in the fuel fill neck at a greater rate than the level of fuel, which rises relatively slowly due to the filling of the upper tank.

When the fuel is introduced into the lower tank from a standard pump nozzle having a conventional vacuum shut-off, the rising foam can close off the vacuum aperture and cause the pump nozzle to shut-off prematurely. Because of the lower tank already being full, the foam corresponding to practically all of the fuel filling into the upper tank collects in the fuel fill neck and typically results in an automatic shut-off of the pump nozzle well before the upper tank is filled. The vehicle, therefore, cannot operate for as long as expected. Depending on the type of pump nozzle being used, the vacuum shut-off may not stop the flow of additional fuel into the tank and result in a discharge of fuel foam out of the fuel fill neck, which is highly undesirable.

Accordingly, it would be advantageous to provide a fuel fill system that would enable the upper tank to be filled completely before the vacuum shut-off of a standard pump nozzle is activated.

SUMMARY OF THE INVENTION

It is an object of this invention to overcome the aforementioned disadvantages of the prior art by providing a fuel fill system that displaces the fuel foam away from the pump nozzle.

It is an advantage of this invention that the fuel foam is deflected away from the inlet opening to the fuel tank so that the foam cannot activate the vacuum shut-off of a standard pump nozzle.

It is a feature of this invention that a filler tube is incorporated into a fuel fill neck to deflect the flow of fuel away from the filler tube.

It is another advantage of this invention that the foam created by the release of gaseous bubbles trapped within the flow of fuel into a fuel tank is restrained within the fuel fill neck outside of the filler tube.

It is another object of this invention to provide a fuel fill system that will allow the upper tank to fill completely before activating the vacuum shut-off of a standard pump nozzle.

It is another feature of this invention that the filler tube is sealed against the inlet opening of the fuel fill neck to prevent the spillage of fuel foam into the filler tube.

It is still another feature of this invention that the filler tube is provided with a vent hole near the inlet opening to vent the fuel fill neck into the filler tube and prevent a pressure build-up within the fuel fill neck.

It is still another advantage of this invention that any fuel foam leaking through the vent hole in the filler tube will be swept down through the filler tube with the inflow of fuel.

It is still another object of this invention to provide a filler tube configuration that prevents a back-surge of fuel after the termination of fuel delivery into the fuel tank.

It is yet another feature of this invention that the filler tube is configured with a reduced diameter and cross-sectional area at the outlet opening.

It is yet another advantage of this invention that any fuel surge rising within the filler tube is dissipated by the larger diameter and cross-sectional area of the filler tube above the outlet opening.

It is a further advantage of this invention that the flow of fuel discharged through the outlet opening of the filler tube is directed toward the upper tank.

It is a further feature of this invention that the distal end of the filler tube incorporates an elbow defining an outlet opening directing the flow of fuel therefrom in a lateral direction from the filler tube toward the upper tank.

It is yet another object of this invention to provide a mechanism for adapting the filler tube improvements to existing fuel tank structures.

It is still a further feature of this invention that an adapter can be utilized to capture a flange formed at the inlet opening of the filler tube between seals and the fuel fill neck to seal the filler tube against the fuel fill neck.

It is yet a further feature of this invention that the adapter can receive a detachable cap to close off the inlet opening to the fuel tank.

It is a further object of this invention to provide a fuel fill system for a tractor having upper and lower fuel tanks filled from a fuel fill neck connected to the lower tank which is durable in construction, inexpensive manufacture, carefree of maintenance, facile in assemblage, and simple and effective in use.

These and other objects, features, and advantages are accomplished according to the instant invention by providing a fuel fill system for use on a tractor having a lower fuel tank provided with an upwardly projecting fuel fill neck and an upper tank connected to the lower tank for flow communication therewith is disclosed wherein a filler tube is sealed against the fuel fill neck to define the inlet opening for the introduction of fuel into the lower tank. The filler tube is provided with a distal elbow defining an outlet opening positioned below the upper tank to direct at least some of the gaseous bubbles within the fuel away from the filler tube to collect in said fuel fill neck or in other remote parts of the upper and lower tanks. A vent hole is provided in the filler tube near the inlet opening to allow the fuel to rise within the fuel fill neck as the upper tank fills. An adapter is threaded onto the fuel fill neck to capture a flange formed on the filler tube at the inlet opening to seal the filler tube against the fuel fill neck. A detachable cap is threadably received on the adapter to close off the inlet opening.

BRIEF DESCRIPTION OF THE DRAWINGS

The advantages of this invention will be apparent upon consideration of the following detailed disclosure of the

Figure 1:
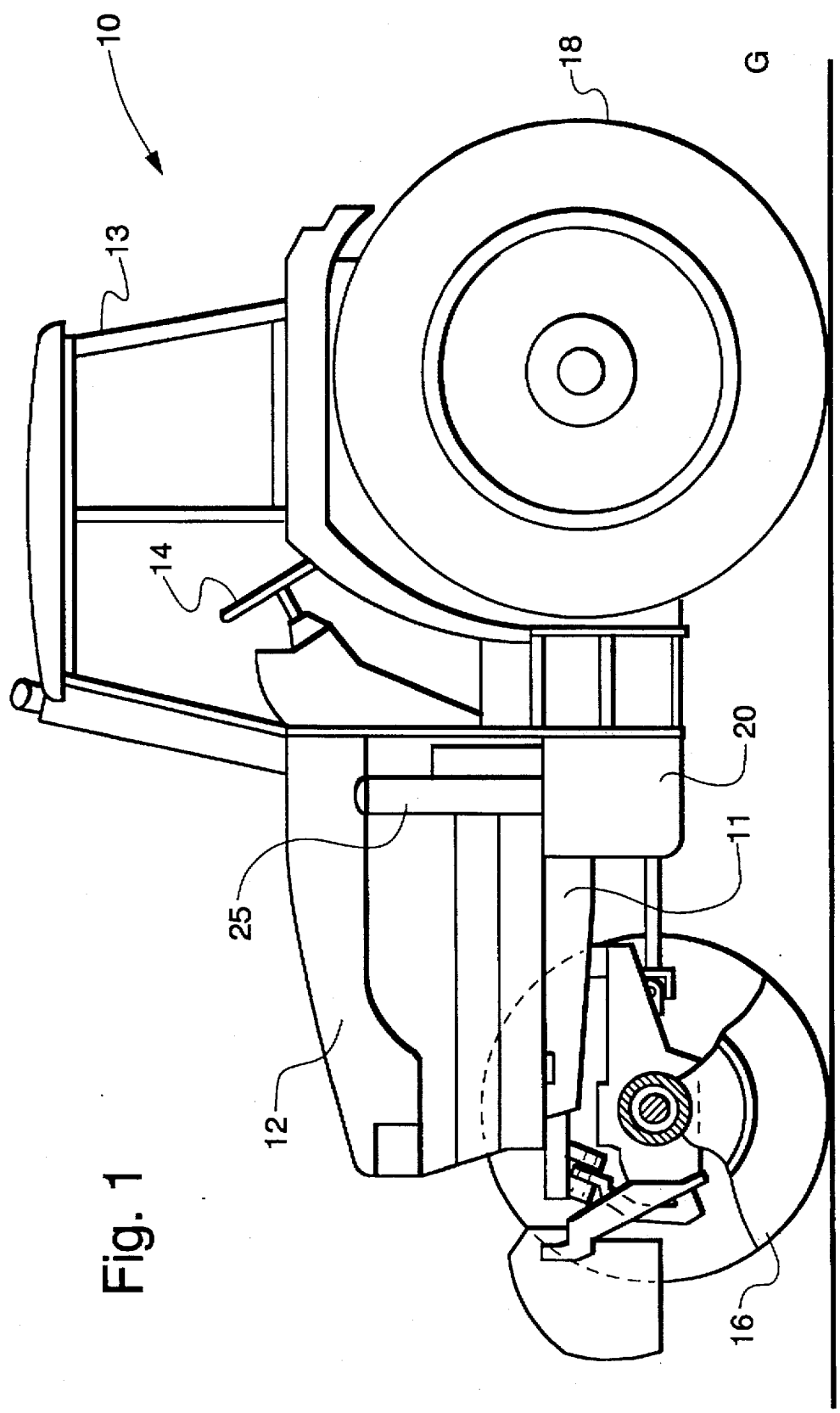
Figure 2:
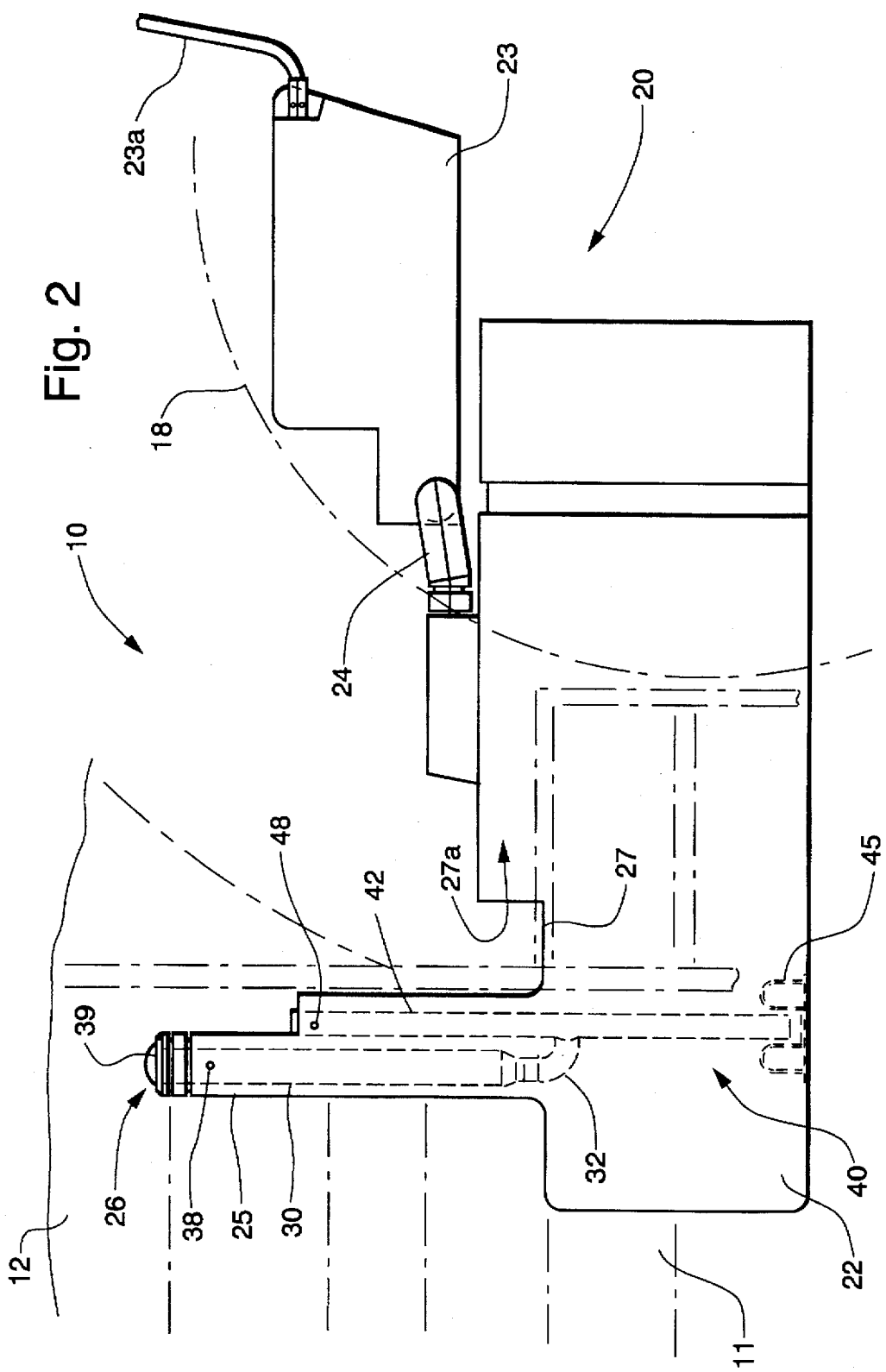
Figure 3:
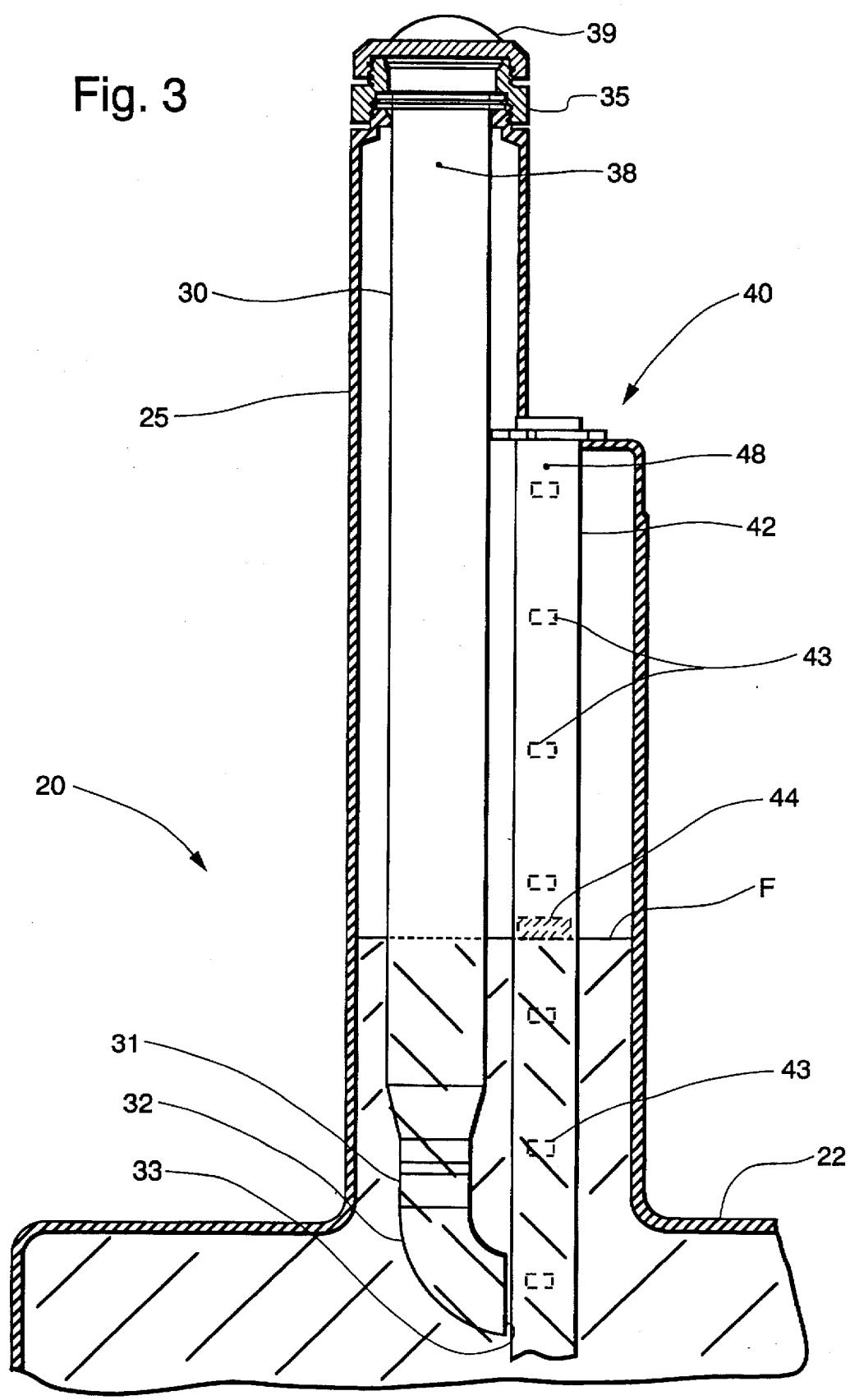
Figure 4:
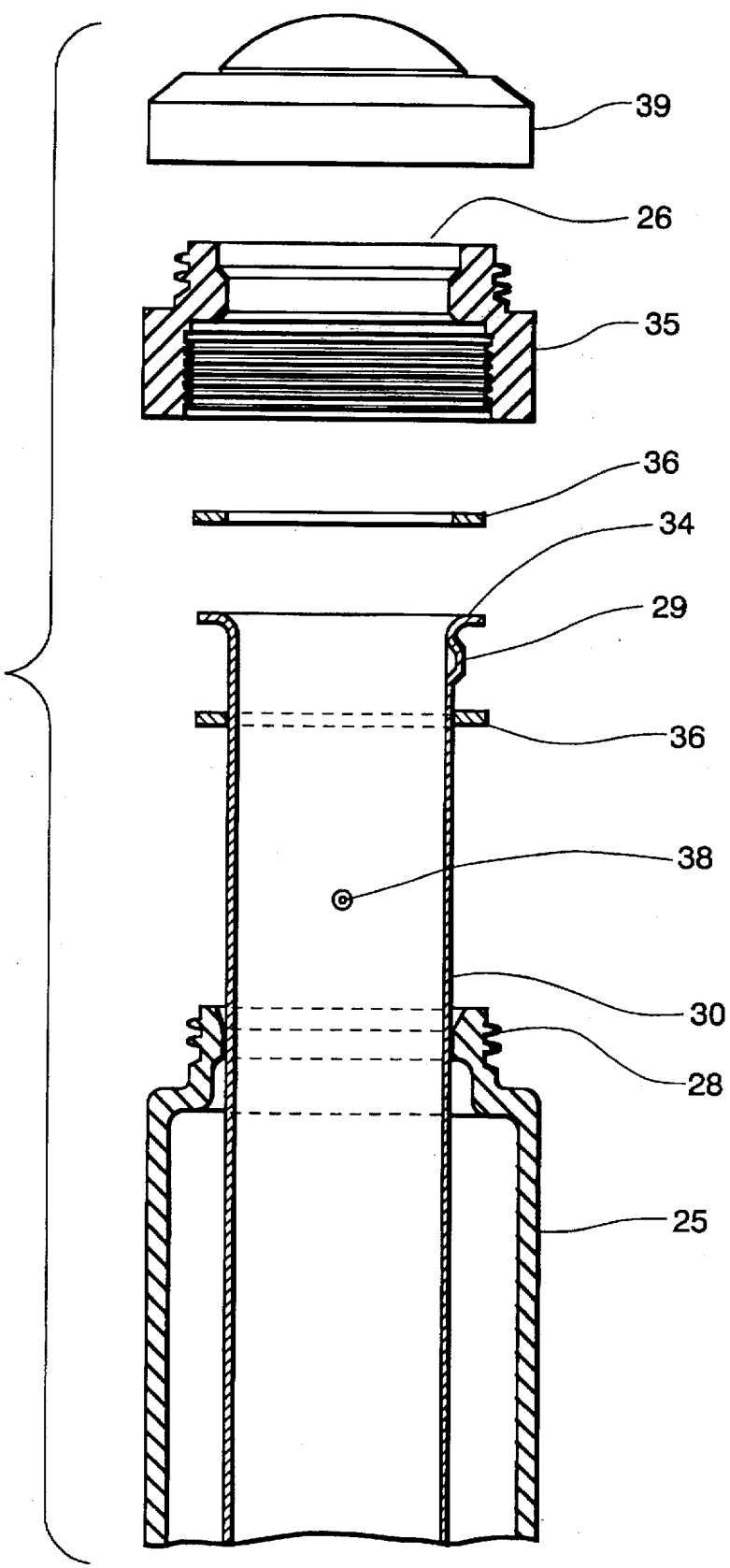
Figure 5:
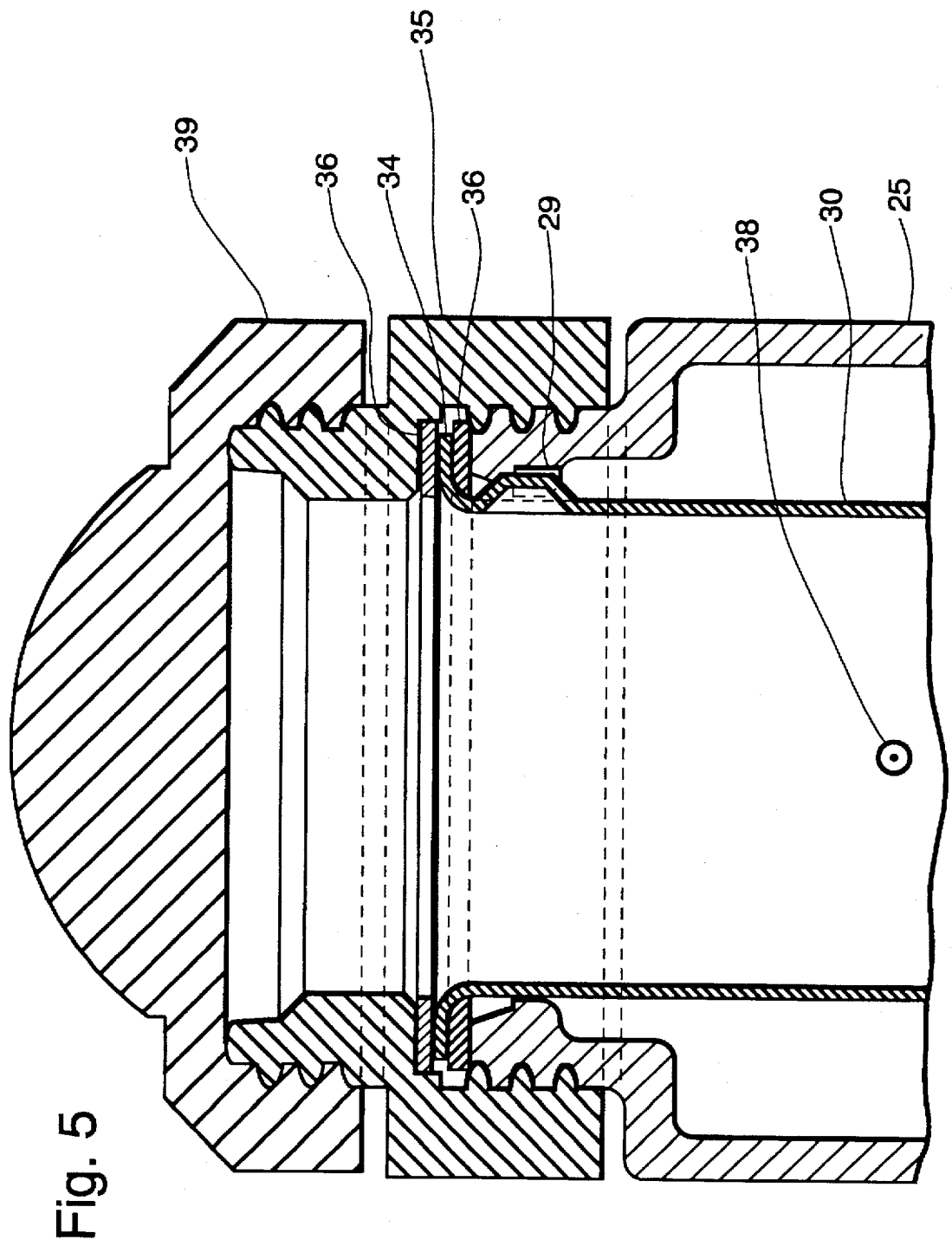

3 invention, especially when taken in conjunction with the accompanying drawings wherein:

FIG. 1 is a side elevational view of a tractor incorporating the principles of the instant invention;

FIG. 2 is an enlarged side elevational view of the fuel tank apparatus with portions of the tractor being depicted in phantom, the filler tube and fuel gauge sender being shown in dotted lines;

FIG. 3 is an enlarged partial cross-sectional view of the fuel fill neck of the lower tank with the level of fuel being depicted part way up the fuel fill neck;

FIG. 4 is an enlarged exploded partial cross-sectional view of the inlet area of the fuel fill neck depicting the adapter mechanism; and FIG. 5 is an enlarged partial elevational view of the inlet portion of the fuel fill neck.

DETAILED DESCRIPTION OF THE PREFERRED EMBODIMENT

Referring now to the drawings and, particularly, to FIGS. 1 and 2, a representative view of an agricultural tractor incorporating the principles of the instant invention can best be seen. Left and right references are used as a matter of convenience and are determined by standing at the rear of the tractor and facing the forward end in the normal direction of travel. The tractor 10 includes a chassis 11 supporting a conventional engine (not shown) located under the front hood 12 and serving to provide operational power for the tractor 10. An operator's cab 13 positioned in an elevated location includes a steering wheel 14, positioned forwardly of the conventional operator's seat (not shown), to operate the steering of the front wheels 16 in a known manner. The chassis 11 is supported above the ground G in a conventional manner by forward steerable wheels 16 and rearward drive wheels 18 rotatably mounted in a customary transversely spaced orientation.

The fuel tank apparatus 20 includes a lower tank 22 and an upper tank 23 interconnected by a connecting line 24 so that the contents of the upper tank 23 can drain by gravity into the lower tank 22. The upper tank is provided with a vent 23a to maintain atmospheric pressure within the upper tank 23. The lower tank 22 includes a fuel fill neck 25 extending upwardly therefrom to terminate at an inlet opening 26 for the introduction of fuel into the lower tank 22. A fuel gauge sender mechanism 40 is incorporated into the lower tank 22 to indicate the level of fuel therewithin, as will be described in greater detail below.

The lower tank 22 can incorporate a barrier 27 dividing the lower tank 22 into a first portion, which as seen in FIG. 2 would be below and forward of the barrier 27, and a second portion, which as seen in FIG. 2 would be rearward of the barrier 27. One skilled in the art will readily recognize that the second portion of the lower tank 22 has a cavity 27a extending above the level or elevation of the barrier 27. As a result, the fuel, when reaching the elevation of the barrier 27, will close off the cavity 27a to prevent the cavity 27a from venting to the atmosphere.

Referring now to FIGS. 2–5, the fuel tank apparatus 20 further includes a filler tube 30 inserted within the fuel fill neck 25 from the inlet opening 26 to terminate at a distal end 31 formed as an elbow 32 defining an outlet opening 33 and directing the flow of fuel therefrom in a lateral direction away from the filler tube 30. The outlet opening 33 is located at an elevation that is below the elevation of the bottom of the upper tank 23 such that the filling of the lower tank 22

4 with fuel covers the outlet opening 33. Furthermore, the orientation of the elbow 32 is such that the outlet opening 33 is directed toward the connecting line 24 to facilitate the filling of the upper tank 23 and the direction of gaseous bubbles within the flow of fuel toward the upper tank 23. A key 29 formed on the filler tube 30 and engageable with a corresponding slot 28 formed in the fuel fill neck 25 at the inlet opening 26 orients the elbow 32 to direct the flow of fuel therefrom toward the connecting line 24.

The fuel gauge sender mechanism 40 includes a generally vertical float tube 42 offset laterally from the filler tube 30 so as not to interfere with the flow of fuel from the outlet opening 33. A restraining doughnut 45 affixed to the bottom of the lower tank 22 prevents the float tube 42 from swinging as fuel gravitates from one side or end of the lower tank 22 to the other, yet allows fuel to enter the float tube 42 to maintain the level therein consistent with the level of fuel within the lower tank 22. As representatively depicted in FIG. 3, the float tube 42 is provided with a plurality of sensors 43 fixed along the length of the float tube 42 at appropriate intervals. The sensors 43 register with the float 44 that remains within the interior of the float tube 42 and moves with the top surface of the fuel therewithin to indicate the level of the fuel within the lower and upper tanks 22, 23.

The filler tube 30 is formed with a flange 34 extending around the circumference of the inlet opening 26. The flange 34 prevents the filler tube from passing through the inlet opening 26 and is engageable with the fuel fill neck 25 at the inlet opening 26. The flange 34 is captured against the fuel fill neck 25 by an adapter member 35 that is threadably engageable with the fuel fill neck 25. A pair of seals 36, positioned above the flange 34 and below, seal the connection of the filler tube 30 to the fuel fill neck 25 when the adapter member 35 is properly engaged. A detachable cap 39 is threadably engaged with the adapter 35 to close off the inlet opening 26 during normal operation of the tractor 10.

As best seen in FIGS. 3–5, the filler tube 30 is provided with a vent hole 38 positioned adjacent the inlet opening 26, but below the seals 36 and flange 34. The vent hole 38 opens the fuel fill neck 25 to the atmosphere during the introduction of fuel into the lower tank 22 and prevents the fuel fill neck 25 from becoming pressurized as the level of fuel rises within the fuel fill neck 25. In actual practice, the vent hole 38 should be sized large enough to prevent a significant pressure build-up, but small enough as to inhibit the flow of fuel foam from the fuel fill neck 25 into the filler tube 30. As a result, a slight pressure differential between the fuel fill neck 25 and the filler tube 30 might result, but is not significant and serves to inhibit the rise of foam within the fuel fill neck 25.

A vent hole 48 at the top of the float tube 42 vents the float tube 42 to the fuel fill neck 25 so that the level of fuel in the float tube 42 is at the same level as the fuel within the fuel fill neck 25. The vent hole 38 is particularly necessary when the fuel gauge sender 40 is positioned within the fuel fill neck 25 so that the level of fuel within the fuel fill neck 25 represents the level of fuel within the tank apparatus 20. If the vent hole 38 is not provided to permit the air captured in the fuel fill neck 25 when the fuel level rises to the bottom of the fuel fill neck 25, the fuel level will be depressed as one skilled in the art will readily realize.

As best seen in FIG. 3, the distal end 31 of the filler tube 30 is necked-down to a smaller diameter and smaller cross-sectional area to connect to the elbow 32. The diameter/cross-sectional area of the outlet opening 33 is significantly smaller than the diameter/cross-sectional area of the filler tube 30 above the elbow 32, which is substantially equal to the inlet opening 26. The purpose of this filler tube 30 configuration is to prevent a back surge of fuel up the filler tube 30 when the delivery of fuel into the lower tank 22 is abruptly halted.

The larger cross-sectional area at the top of the filler tube 30 slows the velocity of the back surge of fuel that is created by the head pressure of the fuel in the tanks 22, 23 and the sudden elimination of the fast-moving fuel into the lower tank 22 from a standard high-flow pump nozzle. This reduction of cross-sectional area at the distal end 31 of the filler tube 30 must be significant enough to prevent fuel from back surging to the inlet opening 26, but not so significant as to prevent the flow of fast moving fuel from the standard pump nozzle from exiting the filler tube 30 and entering the lower tank 22.

In operation to fill the tank apparatus 20 with fuel, the operator of the tractor 10 first removes the detachable cap 39 from the adapter 35 and inserts a standard pump nozzle to initiate the flow of fuel into the lower tank 22. When the body of the lower tank 22 is filled, the level of fuel will be above the outlet opening 33. Any foam created from the initial introduction of fuel into the lower tank 22 will be pushed either into the fuel fill neck 25 or into the connecting line 24 to be further pushed into the upper tank 23. The continued inflow of fuel through the filler tube 30 will exit the outlet opening 33 of the elbow 32 and be directed toward the connecting line 24. Any gaseous bubbles carried by the incoming fuel will be discharged laterally and most of the foam-creating bubbles will flow into the connecting line 24 and ultimately into the upper tank 23. Since the upper tank 23 and cavity 27a are vented to the atmosphere by vent 23a, the influx of gaseous bubbles into the upper tank 23 will not pressurize the upper tank 23 and prematurely stop the flow of fuel before the tank 23 is filled.

Some of the gaseous bubbles will rise directly from the fuel flow and collect in the fuel fill neck 25 to create foam on the top of the fuel surface F. Since the fuel fill neck 25 is closed off by the fuel due to the shape of the lower tank 22 and the continued filling of the upper tank 23, the rising level of fuel and foam would pressurize the cavity above the fuel surface F, except for the vent hole 38 in the filler tube 30 which allows any pressure differential to dissipate into the atmosphere through the filler tube 30. Eventually, however, the amount of foam on top of the fuel surface F will increase to the level of the vent hole 38.

The slight pressure differential within the fuel fill neck 25 will cause foam to discharge through the vent hole 38 into the filler tube 30, whereupon the slight amount of foam will be taken with the inflowing fuel and redeposited into the lower tank 22. The vacuum shut-off of the pump nozzle will, therefore, not be activated by the rising fuel foam and will only be properly activated by the rising level of the fuel within the filler tube, corresponding to the level of fuel within the tank apparatus 20.

Since the filler tube 30 and adapter 35 can be attached to any correspondingly sized fuel fill neck 25, the above-described improvement to a fuel tank apparatus 20 can be adapted to substantially any fuel tank system. In situations where the foam created by gaseous bubbles in inflowing fuel prematurely activates the vacuum shut-off, even in single tank fuel systems, this improvement can be adapted to keep the foam away from the pump nozzle and allow the tank to be completely filled. In dual tank systems, with one tank elevated above the other, the above-described improvement allows the fuel fill neck 25 to be associated with the lower tank 22 so that the upper tank 23 can be filled from the lower tank 22, which is much more convenient for the operator, particularly if the tank apparatus 20 is to be filled from cans of fuel, rather than a high-flow pump nozzle.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

In the way of examples, the upper tank 23 does not necessarily have to be completely above the lower tank 22 as depicted in the drawings. The bottom of the upper tank 23 should be elevated above the bottom of the lower tank 22 so that the fuel can drain from the upper tank 23 into the lower tank 22. Furthermore, if the connecting line 24 is not positioned at the top of the lower tank 22, as depicted in the drawings, the cavity 27a should be vented either into the upper tank 23 or independently to the atmosphere to permit the air within the cavity 27a to escape as the fuel level within the lower tank 22 rises above the barrier 27.

Likewise, the instant invention will also be applicable in a single tank where the barrier 27 defines a cavity 27a that would be vented to the atmosphere to allow the air therein to escape as the fuel level rises. The instant invention would also be beneficial to keep the fuel foam away from the pump nozzle even in a single tank without a barrier 27, although the vent hole 38 would be required to allow the air to escape from the tank after the level of the fuel has risen above the outlet opening 33 of the filler tube 30.

Having thus described the invention, what is claimed is:

1. In a tractor having a wheeled chassis adapted for movement over the ground; an engine supported on said chassis to provide operational power therefor; a fuel tank apparatus for holding a supply of fuel for said engine, said fuel tank apparatus including a first tank portion having an inlet opening and a second tank portion in flow communication with said first tank portion, said second tank portion defining a cavity separated from said first tank portion by a barrier such that said cavity is closed off from said first tank portion when the fuel level within said fuel tank apparatus reaches said barrier, said fuel tank apparatus further including a fuel fill neck connected to said first tank portion in flow communication therewith for the introduction of fuel from an external source of fuel through said inlet opening into said fuel tank apparatus, the improvement comprising:

a filler tube positioned within said fuel fill neck and terminating internally within said fuel tank apparatus, said filler tube having a smaller diameter than said fuel fill neck and being sealed against the inlet opening of said fuel fill neck such that the introduction of fuel into said fuel tank apparatus must pass through said filler tube, said filler tube being operable to direct gaseous bubbles within said fuel into said first tank portion to collect within said fuel tank apparatus outside of said filler tube, said filler tube being provided with a flange at said inlet opening, said tractor further comprising an adapter releasably connected to said fuel fill neck to sealingly compress said flange between said adapter and said fuel fill neck.

2. The tractor of claim 1 wherein said filler tube is provided with a vent hole near said inlet opening to vent said fuel fill neck into said filler tube.

3. The tractor of claim 2 wherein said filler tube terminates at a distal end in said first tank portion at an elevation to direct said gaseous bubbles below said barrier.

4. The tractor of claim 3 wherein the distal end of said filler tube is provided with an elbow to direct the flow of fuel therefrom laterally from said filler tube.

5. The tractor of claim 4 wherein said elbow is oriented to direct the flow of fuel from said filler tube toward said second tank portion.

6. The tractor of claim 5 wherein said elbow defines an outlet opening into said first tank portion, said outlet opening having a smaller cross-sectional area than said filler tube extending from said inlet opening toward said outlet opening.

7. The tractor of claim 6 wherein said second tank portion is vented to the atmosphere.

8. The tractor of claim 7 wherein said filler tube and said elbow have circular cross-sectional configurations, the diameter of said elbow being smaller than the diameter of said filler tube above said elbow.

9. The tractor of claim 7 wherein said first tank portion is provided with a generally vertical float tube capturing a float therewithin to register with sensors supported along the length of said float tube to indicate the level of fuel within said fuel tank apparatus.

10. The tractor of claim 7 wherein said fuel tank apparatus comprises first and second independent tank members interconnected by a connecting line allowing fuel within said second tank member to drain into said first tank member, said first tank member having said first and second tank portions.

11. The tractor of claim 10 wherein the lowest elevation of said second tank member is higher than the lowest elevation of said first tank member.

12. A fuel tank apparatus supported from a tractor chassis to hold a supply of fuel for an engine providing operational power for said tractor comprising:

a lower tank supported from said chassis and having a bottom positioned at a first elevation;

an upper tank supported from said chassis and having a bottom positioned at a second elevation higher than said first elevation, said upper tank being vented to the atmosphere;

a connecting line interconnecting said lower and upper tanks to provide flow communication therebetween;

a fuel fill neck forming an integral part of said lower tank, said fuel fill neck defining an inlet opening having an elevation higher than said second elevation; and a filler tube positioned within said fuel fill neck and terminating at an elbow to direct the flow of fuel therefrom laterally from said filler tube, said elbow defining a distal opening of said filler tube within said lower tank, said distal opening having an elevation lower than said connecting line, said filler tube being sealed against said fuel fill neck so that the introduction of fuel into said lower tank must pass through said distal opening, said filler tube being formed with a key engageable with a corresponding slot in said fuel fill neck to orient said elbow to direct the flow of fuel therefrom toward said upper tank.

13. The fuel tank apparatus of claim 12 wherein said outlet opening having a smaller cross-sectional area than said filler tube extending from said inlet opening toward said outlet opening.

14. The fuel tank apparatus of claim 13 wherein said elbow is oriented to direct the flow of fuel from said filler tube toward said connecting line between said upper and lower tanks.

15. The fuel tank apparatus of claim 14 wherein said filler tube is provided with a vent hole near said inlet opening to vent said fuel fill neck into said filler tube.

16. The fuel tank apparatus of claim 15 wherein said filler tube is provided with a flange at said inlet opening, said tractor further comprising an adapter releasably connected to said fuel fill neck to sealingly compress said flange between said adapter and said fuel fill neck, said detachable cap being threadably received on said adapter to close said inlet opening.

17. A tractor comprising:

a mobile chassis adapted for movement over the ground;

an engine supported from said chassis to provide operative power for said tractor; and a fuel tank apparatus operable to hold a supply of fuel for said engine, said fuel tank apparatus including:

a lower tank positioned at a first elevation;

an upper tank positioned at a second elevation higher than said first elevation;

a connecting line interconnecting said upper and lower tanks in flow communication;

a fuel fill neck connected to said lower tank in flow communication therewith for the introduction of fuel from an external source of fuel into said fuel tank apparatus, said fuel fill neck having an inlet opening adapted for connection to a detachable cap for closing said inlet opening;

a filler tube positioned within said fuel fill neck and terminating within said lower tank, said filler tube having a smaller diameter than said fuel fill neck and being sealed against the inlet opening of said fuel fill neck such that the introduction of fuel into said fuel tank apparatus must pass through said filler tube;

an adapter releasably connected to said fuel fill neck to sealingly compress a flange formed at the inlet opening of said filler tube between said adapter and said fuel fill neck; and a detachable cap being threadably received on said adapter to close said inlet opening which is positioned at an elevation higher than said upper tank, said upper tank being vented to the atmosphere.

18. The tractor of claim 17 wherein said filler tube terminates at a distal end provided with an elbow defining an outlet opening to direct the flow of fuel therefrom laterally from said filler tube and toward the connection between said upper and lower tanks.

19. The tractor of claim 18 wherein said filler tube includes a vent hole near said inlet opening to vent said fuel fill neck into said filler tube.

20. The tractor of claim 19 wherein said lower tank includes a barrier dividing said lower tank into a first lower tank portion and a second lower tank portion, said second lower tank portion defining a cavity closed off from said first lower tank portion when the fuel level within said lower tank reaches said barrier, said outlet opening of said filler tube being positioned at an elevation below said barrier.

21. A fuel tank apparatus supported from a vehicle to hold a supply of fuel for an engine providing operational power for said vehicle comprising:

a tank supported from said chassis and having a fuel fill neck to introduce fuel into said tank from an external source of fuel, said fuel fill neck defining an inlet opening having an elevation higher than any part of said tank;

a filler tube positioned within said fuel fill neck and having an elbow at a distal end thereof defining an outlet opening for the discharge of fuel into said tank and for directing the flow of fuel laterally of said filler tube, said filler tube being sealed against said fuel fill neck so that the introduction of fuel into said lower tank must pass through said outlet opening, said filler tube having a vent hole near said inlet opening to vent said fuel fill neck into said filler tube and a flange at said inlet opening; and an adapter releasably connected to said fuel fill neck to sealingly compress said flange between said adapter and said fuel fill neck.

22. The fuel tank apparatus of claim 21 wherein said tank includes a first tank portion and a second tank portion in flow communication with said first tank portion, said second tank portion defining a cavity separated from said first tank portion by a barrier such that said cavity is closed off from said first tank portion when the fuel level within said fuel tank apparatus reaches said barrier, said cavity being vented to the atmosphere.

23. The fuel tank apparatus of claim 22 wherein said outlet opening is at an elevation lower than said barrier.

24. The fuel tank apparatus of claim 23 further comprising a lower tank member including said first and second tank portions and an independent upper tank member interconnected with said lower tank member by a connecting line allowing fuel within said upper tank member to drain into said lower tank member, said upper tank member being vented to the atmosphere and having a bottom positioned at an elevation higher than at least a portion of said lower tank member.

25. The fuel tank apparatus of claim 24 wherein said outlet opening has a smaller cross-sectional area than the cross-sectional area of said filler tube extending from said inlet opening toward said outlet opening.

26. The fuel tank apparatus of claim 24 wherein said filler tube is formed with a key engageable with a corresponding slot in said fuel fill neck to orient said elbow to direct the flow of fuel therefrom toward said upper tank, said fuel tank apparatus further comprising a detachable cap threadably received on said adapter to close said inlet opening.

* * * * *